(12) United States Patent
Yeh

(10) Patent No.: US 10,946,505 B2
(45) Date of Patent: Mar. 16, 2021

(54) TORSION SPRING AND A FASTENER DRIVING TOOL WITH THE SAME

(71) Applicant: Pao Shen Enterprises Co., Ltd., Chang Hua (TW)

(72) Inventor: Sheng-Lung Yeh, Chang Hua (TW)

(73) Assignee: Pao Shen Enterprises Co., Ltd., Chang Hua (TW)

( * ) Notice: Subject to any disclaimer, the term of this patent is extended or adjusted under 35 U.S.C. 154(b) by 169 days.

(21) Appl. No.: 16/045,810

(22) Filed: Jul. 26, 2018

(65) Prior Publication Data

US 2019/0337133 A1 Nov. 7, 2019

(30) Foreign Application Priority Data

May 4, 2018 (TW) .............................. 107115306 A

(51) Int. Cl.
| | |
|---|---|
| *B25C 5/11* | (2006.01) |
| *B25C 5/02* | (2006.01) |
| *F16F 1/12* | (2006.01) |
| *F16F 1/06* | (2006.01) |

(52) U.S. Cl.
CPC .............. *B25C 5/11* (2013.01); *B25C 5/0285* (2013.01); *F16F 1/06* (2013.01); *F16F 1/12* (2013.01); *F16F 2224/0208* (2013.01); *F16F 2238/024* (2013.01)

(58) Field of Classification Search
USPC ........................................................ 227/132
See application file for complete search history.

(56) References Cited

U.S. PATENT DOCUMENTS

| | | | |
|---|---|---|---|
| 2002/0108996 A1* | 8/2002 | Cornett ...................... | B25C 5/00 227/132 |
| 2004/0164120 A1* | 8/2004 | Boswinkel ............ | B25C 5/0257 227/132 |
| 2007/0175946 A1* | 8/2007 | Marks ................... | B25C 5/0242 227/132 |
| 2008/0149681 A1* | 6/2008 | Marks ..................... | B25C 5/025 227/119 |
| 2008/0149683 A1* | 6/2008 | Marks ..................... | B25C 5/025 227/132 |
| 2013/0228607 A1* | 9/2013 | Marks ....................... | B25C 5/11 227/132 |
| 2017/0239798 A1* | 8/2017 | Marks ....................... | B25C 5/06 |

FOREIGN PATENT DOCUMENTS

JP H11193045 A 7/1999

* cited by examiner

*Primary Examiner* — Anna K Kinsaul
*Assistant Examiner* — Chinyere J Rushing-Tucker
(74) *Attorney, Agent, or Firm* — Burris Law, PLLC

(57) ABSTRACT

A fastener driving tool includes a housing, a striking member, an energy storing unit and a handle unit. The energy storing unit has a torsion spring which has weighted and driving legs extending from two ends of a coil. The driving leg is biased against and engaged with the weighted leg to be preloaded with a downward potential energy that urges a downward movement of the torsion spring and the striking member. The handle unit includes a handle and an anchoring member removably engaged with the striking member. When the handle is pivotally moved from a ready position to a striking position, the weighted leg is moved downwardly and the anchoring member and the striking member are moved upwardly to gradually increase a loading of the torsion spring for the striking member.

8 Claims, 17 Drawing Sheets

TORSION SPRING AND A FASTENER DRIVING TOOL WITH THE SAME

CROSS-REFERENCE TO RELATED APPLICATION

This application claims priority of Taiwanese Patent Application No. 107115306, filed on May 4, 2018.

FIELD

The disclosure relates to a fastener driving tool, and more particularly to a torsion spring and a fastener driving tool with the same.

BACKGROUND

Referring to FIGS. 1 and 2, a conventional spring actuated fastener driving tool 1 as disclosed in Taiwanese Patent Publication No. 545350 includes a housing 11, a nail striking unit 12 and a handle unit 13. The housing 11 has an axle shaft 111. The nail striking unit 12 has a striking member 121 mounted in a front portion of the housing 11 for reciprocal movement in an upper-and-lower direction (Z), and a leaf-spring 122 disposed in the housing 11 and engaged at a front end with the striking member 121. The handle unit 13 has a handle 131 pivotably mounted to the axle shaft 111, and a compressible spring 132 disposed in the housing 11 to be compressed to produce a biasing force to the handle 131. The handle 131 has an elongated guide slot 133 to permit sliding movement relative to the axle shaft 111, and is removably engaged with the striking member 121 at a front end of the handle 131.

When the handle 131 is pivoted about the central shaft 111 by a manual press force applied on a rear end of the handle 131 to move the striking member 121 upwardly, the leaf-spring 122 is resiliently deflected and loaded. Then, a successive pivot movement of the handle 131 results in disengagement thereof from the striking member 121, and at this moment the leaf spring 122 is thus freed to resiliently return the striking member 121 downwardly to eject a fastener.

However, during a pivot movement of the handle 131, the leaf-spring 122, which is made of a metal plate with a required thickness, is needed to accumulate a sufficient biasing energy. Thus, a large operating effort is required to permit deflection of the leaf-spring 122 and to move the striking member 121 a long distance to bend the leaf-spring 122 to a sufficient degree.

SUMMARY

Therefore, an object of the disclosure is to provide a torsion spring and a fastener driving tool with the same that can alleviate at least one of the drawbacks of the prior art.

According to the disclosure, the torsion spring is mountable on a fastener driving tool to be biased for storing a striking energy in an up-and-down direction, and includes a coil, a weighted leg and a driving leg. The coil is wound about a coil axis that extends in a left-and-right direction when the torsion spring is mounted on the fastener driving tool, and has first and second coil ends opposite to each other in both the left-and-right direction and the up-and-down direction. The weighted leg is configured to extend forwardly from the first coil end of the coil, in turns be bent downwardly, and be bent toward the second coil end in the left-and-right direction to terminate at a first distal end. The driving leg is configured to extend forwardly from the second coil end of the coil and beyond the weighted leg in a front-and-rear direction to terminate at a second distal end. The driving leg is biased, when the torsion spring is mounted on the fastener driving tool in a loaded state, to be biased against and engaged with the first distal end so as to be preloaded with a downward potential energy that urges a downward movement of the second distal end.

According to the disclosure, the fastener driving tool includes a housing, a striking member, an energy storing unit and a handle unit. The housing defines a housing space therein, and has a pivot axle which is disposed in the housing space, a coil axle which is disposed rearwardly of the pivot axle, and a fastener striking opening at a bottom of a forward end of the housing. The striking member is mounted in the housing space for reciprocal movement in an up-and-down direction. The striking member has a lower striking end which faces the fastener striking opening, and an upper driven end which is opposite to the lower striking end. The energy storing unit is disposed in the housing space, and includes a torsion spring which is twistable about the coil axle. The torsion spring has a coil which is rotatably sleeved around the coil axle, and which has first and second coil ends opposite to each other in both a left-and-right direction and the up-and-down direction, a weighted leg which is configured to extend forwardly from the first coil end of the coil, in turns be bent downwardly, and be bent toward the second coil end in the left-and-right direction to terminate at a first distal end, and a driving leg which is configured to extend forwardly from the second coil end of the coil and beyond the weighted leg in a front-and-rear direction to terminate at a second distal end. The second distal end is disposed forwardly of the first distal end to engage with the striking member. The driving leg is biased against and engaged with the first distal end so as to be preloaded with a downward potential energy that urges a downward movement of the second distal end and the striking member. The energy storing unit further includes a return spring which is disposed downwardly of the weighted leg to be compressed by the weighted leg to store a return energy. The handle unit includes a handle having a front pivot end which is pivotably mounted in the housing space and on the pivot axle, a rear effort end which is opposite to the front pivot end, and a forcing portion which is interposed between the front pivot end and the rear effort end and which is disposed to force the weighted leg to move downwardly when the rear effort end is turned about the pivot axle. The handle unit further includes an anchoring member which is movably mounted to the front pivot end of the handle and which is removably engaged with the upper driven end of the striking member, and a biasing member which is disposed to bias the anchoring member forwardly. The handle is pivotally movable relative to the pivot axle from a ready position, where the anchoring member is engaged with the striking member, through an intermediate position, where, via an abutting engagement of the forcing portion with the weighted leg, the weighted leg is moved downwardly to compress the return spring to generate the return energy, and where the anchoring member is moved with the handle for being brought upwardly and rearwardly to engagingly move the striking member and the driving leg of the torsion spring upwardly to gradually increase a loading of the torsion spring for the striking member, to a striking position, where the anchoring member is disengaged from the striking member, and the torsion spring is freed to release a biasing energy to move the striking member downward toward the fastener striking opening. During a pivotal movement of the handle from the striking position to the ready position, the return spring is freed to release the return energy to urge the torsion spring upwardly and to cause the pivot movement of the handle and the anchoring member about the pivot axle and an upward movement of the driving leg and the striking member to make a sliding engagement of the striking member with the anchoring member in the up-and-down direction, while the biasing member is loaded to accumulate a biasing force that urges the anchoring member to be engaged with the striking member.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
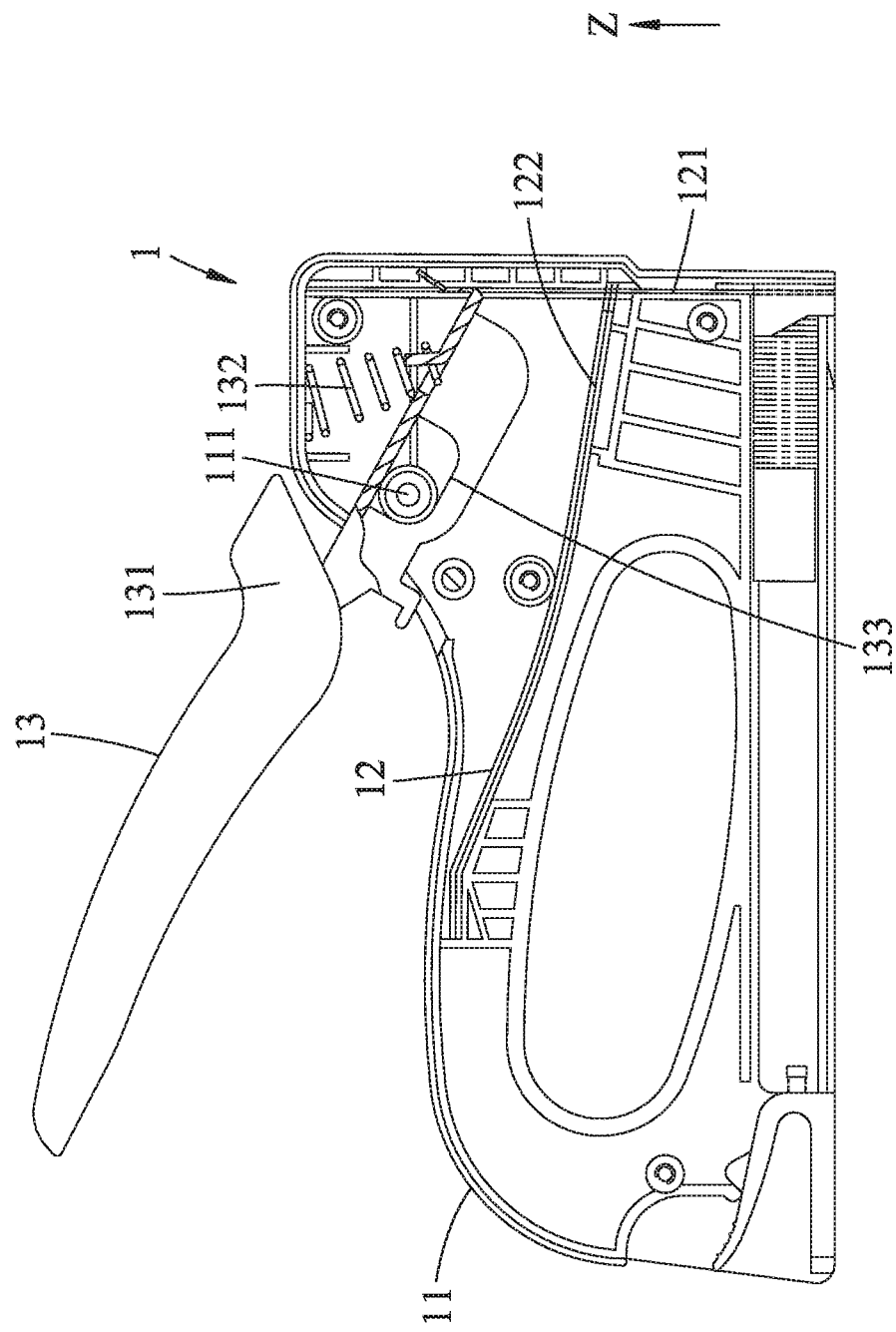
FIG. 1 is a schematic partly-sectioned view of a conventional spring actuated fastener driving tool.
Figure 2:
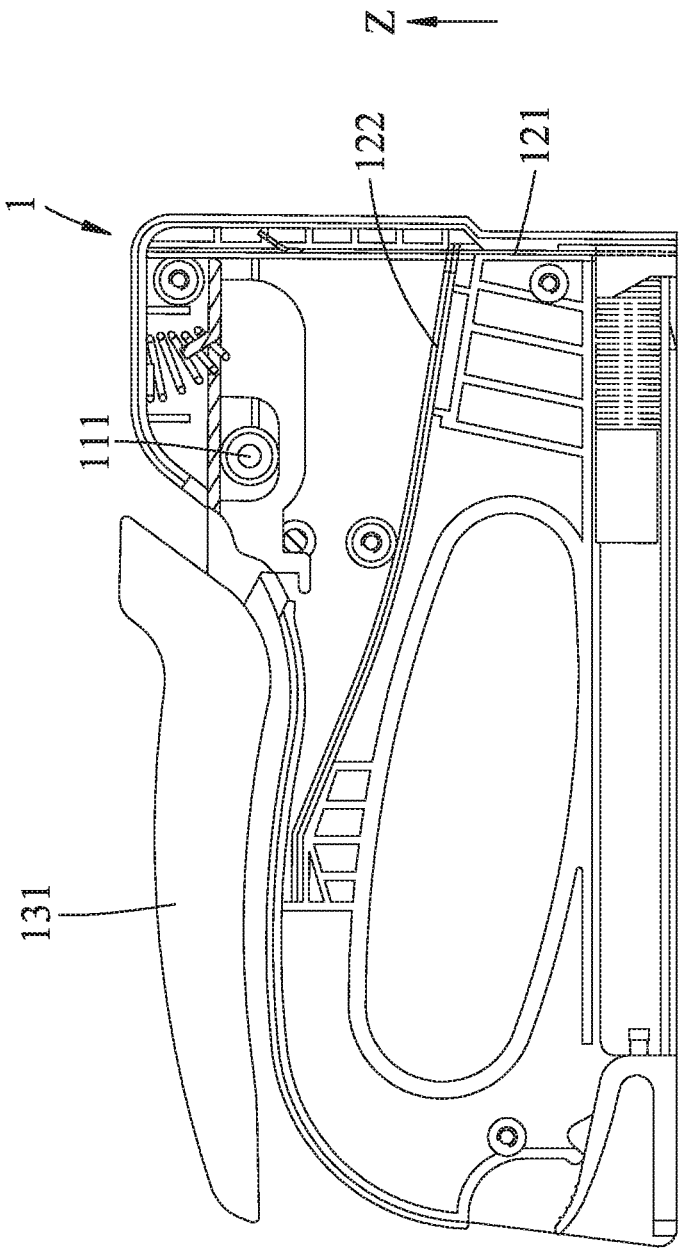
FIG. 2 is a schematic partly-sectioned view of the conventional fastener driving tool illustrating a state where a handle is pressed.

Before the disclosure is described in greater detail, it should be noted that where considered appropriate, reference numerals or terminal portions of reference numerals have been repeated among the figures to indicate corresponding or analogous elements, which may optionally have similar characteristics. In the following description, directions, such as "front-and-rear direction (X)", "left-and-right direction (Y)" and "up-and-down direction (Z)", indicate the orientations of the embodiments in use.

Figure 3:
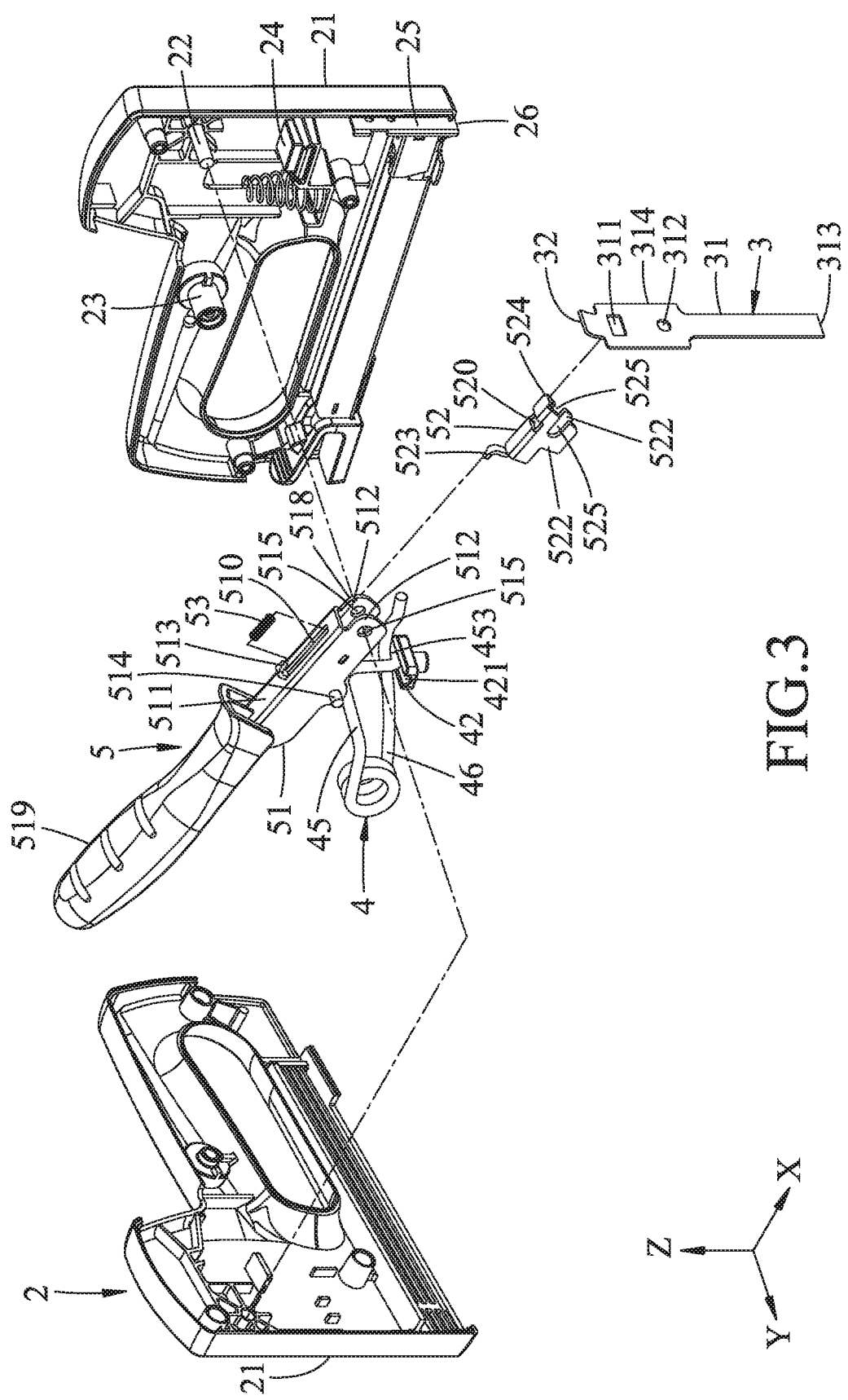
FIG. 3 is an exploded perspective view illustrating an embodiment of a fastener driving tool according to the disclosure.
Figure 4:
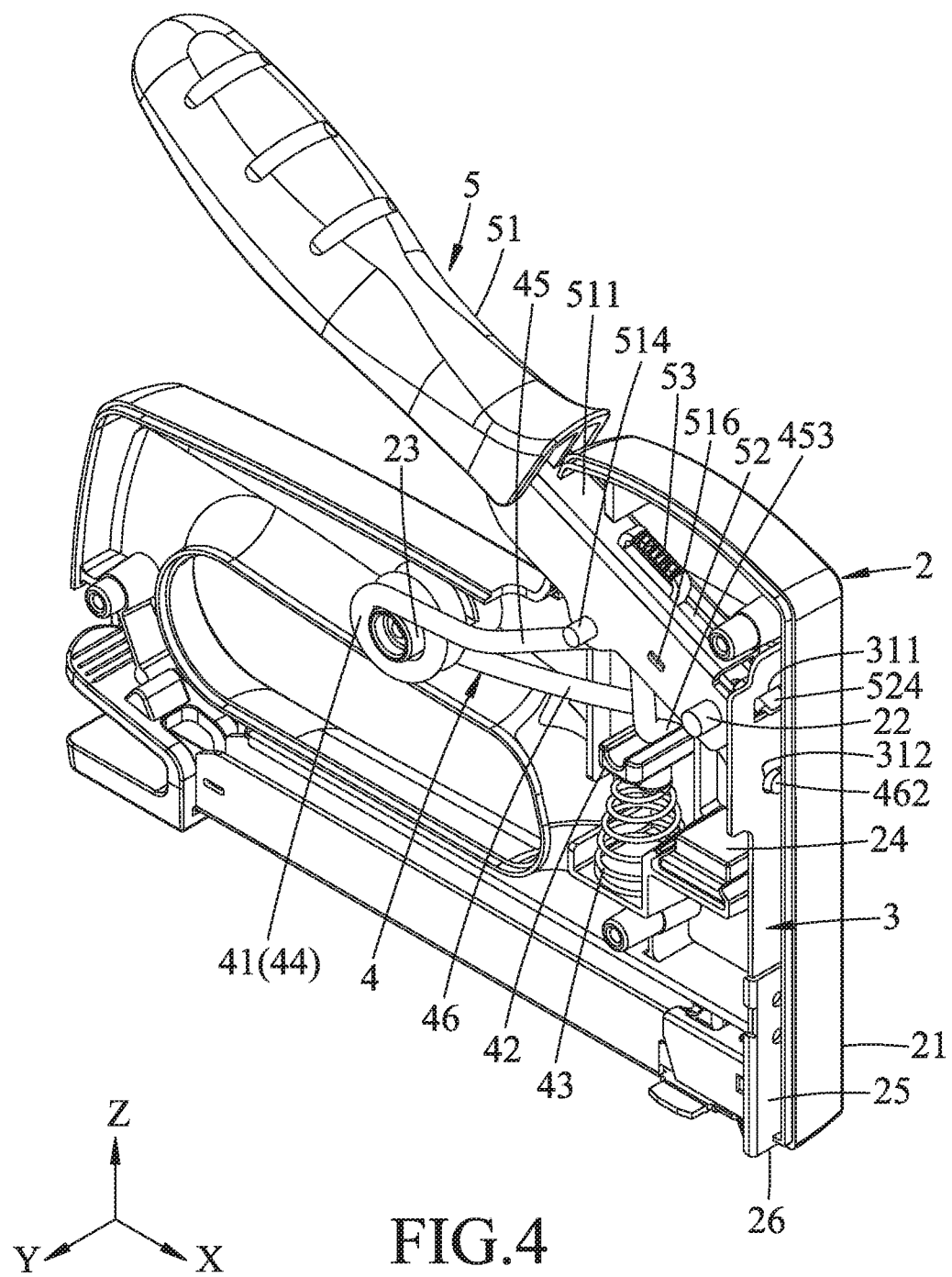
FIG. 4 is a perspective view of the embodiment, wherein a housing half of the embodiment is removed for the sake of clarity, and wherein a state where a handle of a handle unit is in a ready position is illustrated.

Referring to FIGS. 3 and 4, an embodiment of a fastener driving tool according to the disclosure is shown to include a housing 2, a striking member 3, an energy storing unit 4 and a handle unit 5.

The housing 2 has two housing halves 21 which are matingly engaged with each other to define a housing space, a pivot axle 22 which is disposed in the housing space and extends in a left-and-right direction (Y), a coil axle 23 which is disposed rearwardly of and parallel to the pivot axle 22, a stop 24 which is disposed in the housing space and downwardly of the pivot axle 22, a guiding bracket 25 which is disposed adjacent to a forward end of the housing halves 21, and a fastener striking opening 26 which is located at a bottom of the forward end of the housing halves 21 and a bottom end of the guiding bracket 25.

The striking member 3 is mounted in the housing space for reciprocal movement in an up-and-down direction (Z). The striking member 3 includes an elongated plate body 31 having a lower striking end 313 which faces the fastener striking opening 26, and an upper driven end 314 which is opposite to the lower striking end 313 and which is formed with an engaged slot 311 and a connected slot 312 below the engaged slot 311. The striking member 3 further includes a sliding portion 32 extending upwardly from and deflected forwardly of the upper driven end 314 of the plate body 31.

Figure 5:
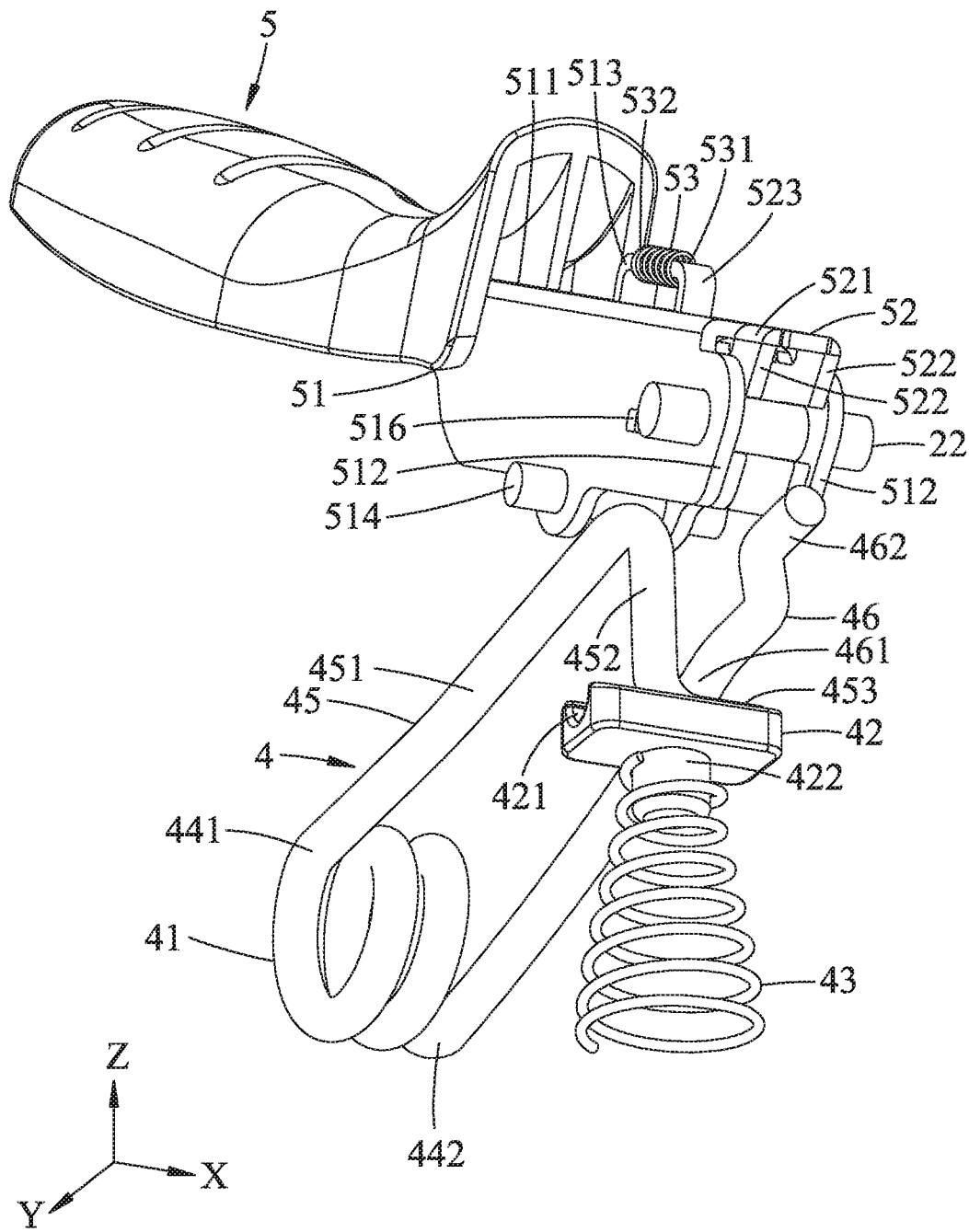
FIG. 5 is a perspective view of the handle unit and an energy storing unit of the embodiment.
Figure 6:
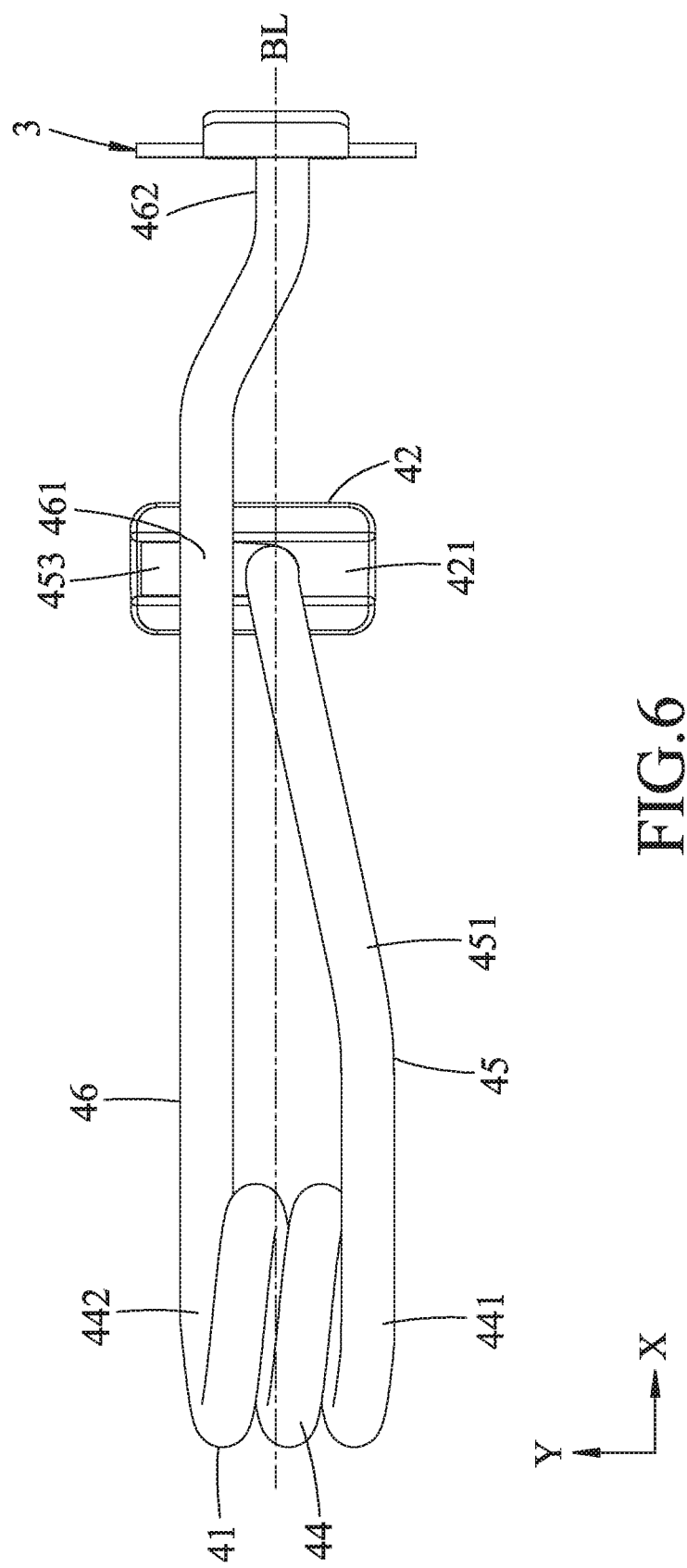
FIG. 6 is a top view of a torsion spring of the energy storing unit of the embodiment in a loaded state.

With reference to FIGS. 4 to 6, the energy storing unit 4 is disposed in the housing space, and includes a torsion spring 41 which is twistable about the coil axle 23, a holding seat 42 for holding the torsion spring 41, and a return spring 43.

The torsion spring 41 is made of a metal wire which is twisted and which has a wire diameter ranging from 3 mm to 4.5 mm to be biased for storing a striking energy in the up-and-down direction (Z). The torsion spring 41 has a coil 44, a weighted leg 45 and a driving leg 46. The coil 44 is rotatably sleeved around the coil axle 23 to be wound about a coil axis, and has first and second coil ends 441, 442 opposite to each other in both the left-and-right direction (Y) and the up-and-down direction (Z). The weighted leg 45 is configured to extend forwardly from the first coil end 441 of the coil 44, in turns be bent downwardly, and be bent toward the second coil end 442 in the left-and-right direction (Y) to terminate at a first distal end 453. Specifically, the weighted leg 45 has a connecting segment 451 extending forwardly from the first coil end 441 of the coil 44, and a middle segment 452 extending downwardly in the up-and-down direction (Z) from an end of the connecting segment 451 opposite to the first coil end 441. The first distal end 453 extends from an end of the middle segment 452 toward the driving leg 46 in the left-and-right direction (Y). The driving leg 46 is configured to extend forwardly from the second coil end 442 of the coil 44 and beyond the weighted leg 45 in a front-and-rear direction (X) to terminate at a second distal end 462. Specifically, the driving leg 46 has an extending segment 461 which extends forwardly from the second coil end 442 of the coil 44 to terminate at the second distal end 462. The second distal end 462 may extend to incline rightwardly relative to the extending segment 461.

Figure 7:
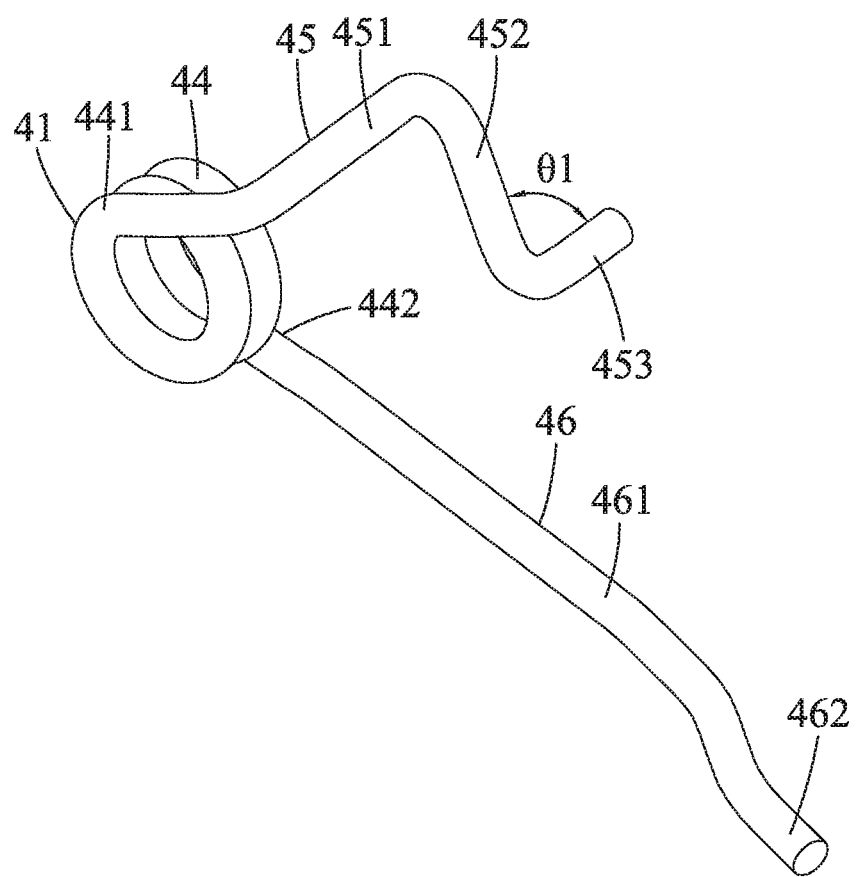
FIG. 7 is a perspective view of the torsion spring in an unloaded state.
Figure 8:
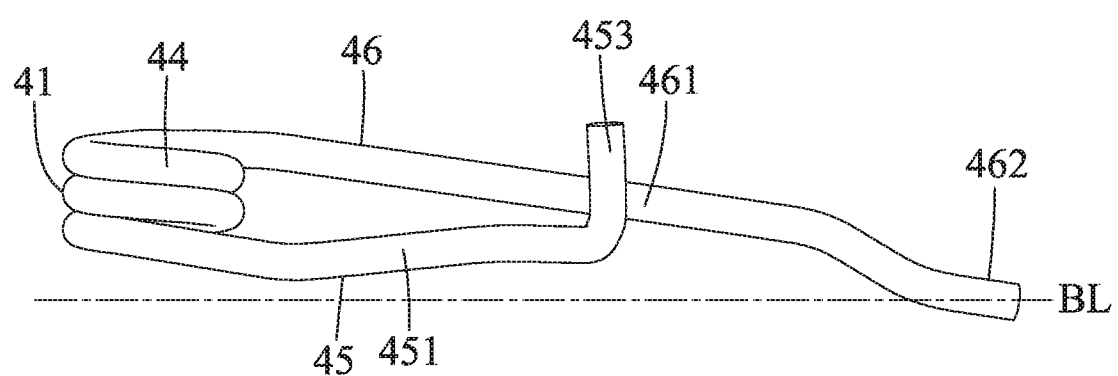
FIG. 8 is a top view of the torsion spring in the unloaded state.
Figure 9:
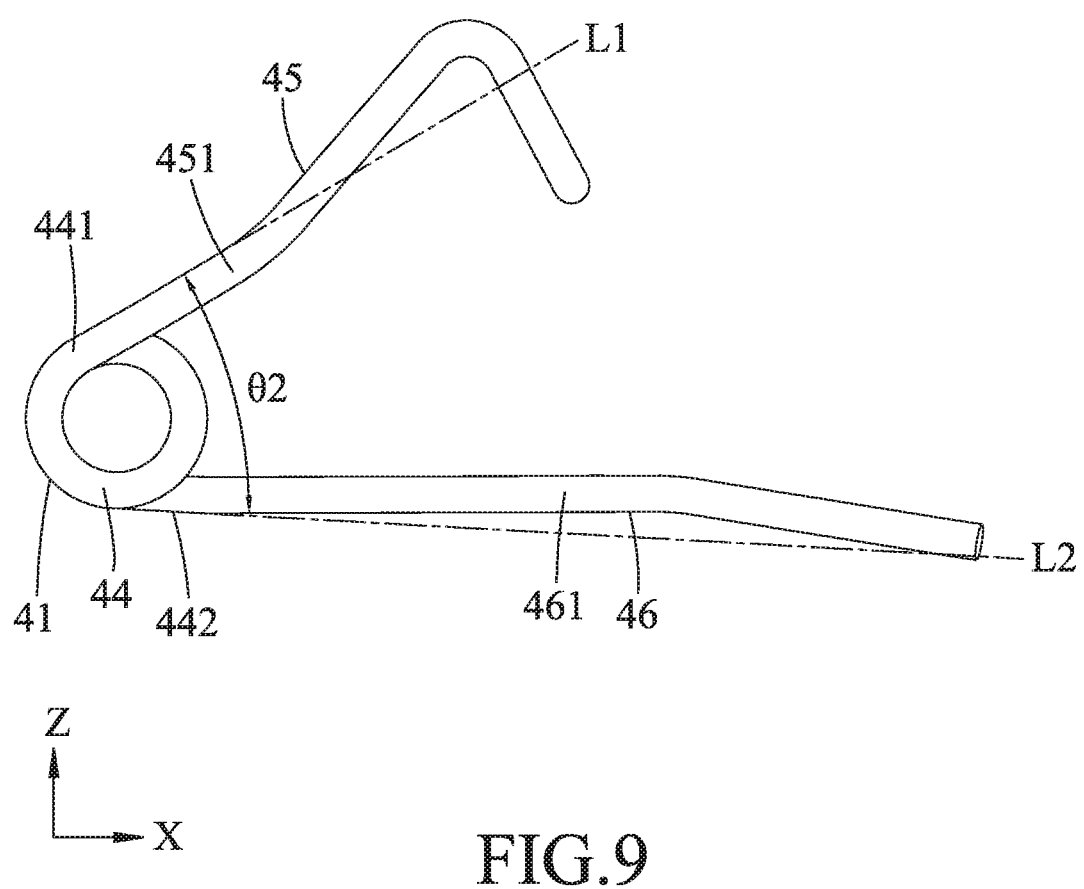
FIG. 9 is a side view of the torsion spring in the unloaded state.
Figure 10:
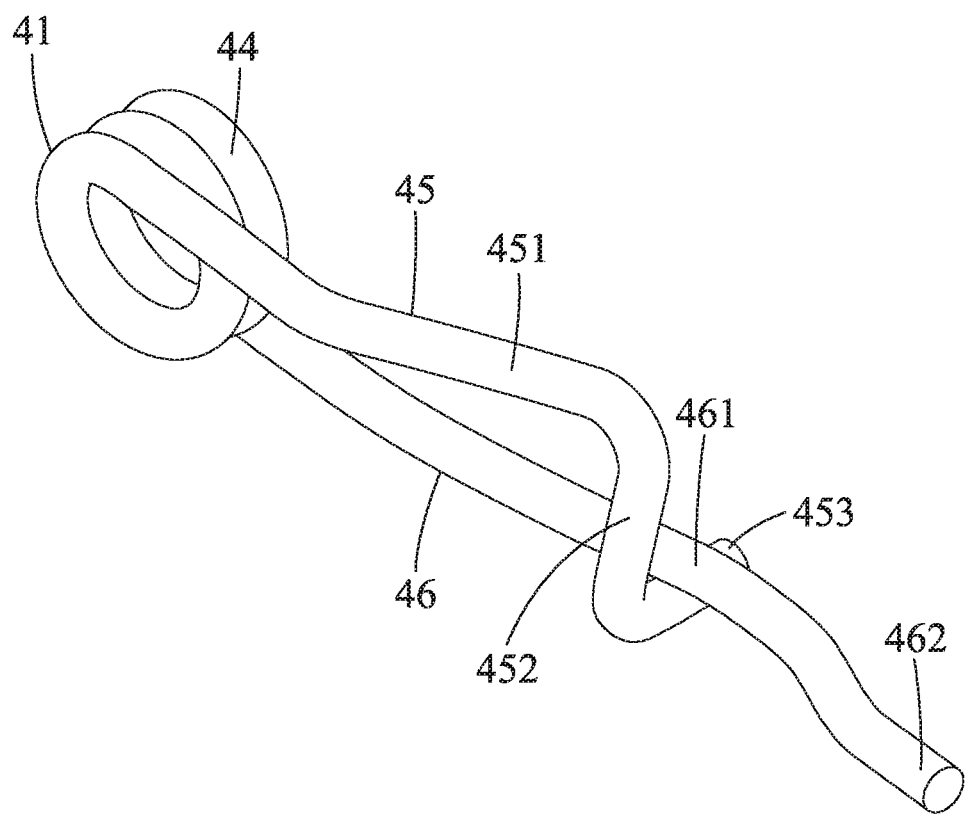
FIG. 10 is a perspective view of the torsion spring in the loaded state.

With reference to FIGS. 6 to 9, with the torsion spring 41 made of a metal wire, the torsion spring 41 is twistable, when mounted in the housing 2, from an unloaded state (see FIG. 7), where the extending segment 461 is freed to be disposed downwardly of and spaced apart from the first distal end 453, to a loaded state (see FIG. 6), where the driving leg 46 is biased against and engaged with the first distal end 453 so as to be preloaded with a downward potential energy that urges a downward movement of the second distal end 462. Referring to FIGS. 8 and 9, in the unloaded state, the connecting segment 451 of the weighted leg 45 extends tangentially from the first coil end 441 of the coil 44 and along a first extending line (L1), and in turn extends to incline upwardly and leftwardly. The extending segment 461 of the driving leg 46 extends tangentially from the second coil end 442 of the coil 44 and along a second extending line (L2). Also, referring to FIG. 7, the first distal end 453 extends to intersect the middle segment 452 by an included angle (θ1) not more than 90 degrees. Referring again to FIG. 9, the second extending line (L2) intersects the first extending line (L1) by an included angle (θ2) ranging from 15 degrees to 45 degrees. In this embodiment, the included angle (θ1) is 90 degrees, and the included angle (θ2) is 28 degrees. As shown in FIGS. 7 and 10, when the torsion spring 41 is to be mounted in the housing 2, the extending segment 461 of the driving leg 46 is deflected upwardly by a tool (not shown) to be biased against and held on the first distal end 453. Then, referring to FIGS. 4 and 6, the coil 44 of the torsion spring 41 is sleeved around the coil axle 23 to have the second distal end 462 be inserted into the connected slot 312 of the striking member 3 such that the downward potential energy also urges a downward movement of the striking member 3.

Referring to FIGS. 6 and 8, the driving leg 46 defines a reference line (BL) that extends in the front-and-rear direction (X) and through a center of a wire diameter of the second distal end 462. Preferably, the torsion spring 41 is configured such that the coil 44 is offset from the reference line (BL) in the unloaded state, and is located at the reference line (BL) in the loaded state. With such configuration of the torsion spring 41, the driving leg 46 is reliably biased against and engaged with the weighted leg 45 without undesired disengagement from the weighted leg 45 during use. In a modified form, the first distal end 453 may be inclined upwardly relative to the middle segment 452 to have the included angle (θ1) (see FIG. 7) less than 90 degrees. Thus, disengagement of the extending segment 461 from the first distal end 453 can be further avoided. In this case, the coil 44 may be located at the reference line (BL) in the unloaded state.

The holding seat 42 has an upwardly opened recess 421 formed in an upper surface thereof, and a lower protrusion 422 formed on a lower surface thereof. The first distal end 453 of the weighted leg 45 is retained in the recess 421. The return spring 43 is disposed between a bracket on one of the housing halves 21 and the lower protrusion 422 and downwardly of the weighted leg 45 to be compressed by the weighted leg 45 to store a return energy.

With reference to FIGS. 3 to 5, the handle unit 5 is disposed upwardly of the energy storing unit 4, and includes a handle 51, an anchoring member 52 and a biasing member 53.

The handle 51 has a front pivot end 518 which is pivotably mounted in the housing space and on the pivot axle 22, a rear effort end 519 which is opposite to the front pivot end 518, and a forcing portion 514 which is interposed between the front pivot end 518 and the rear effort end 519 and which is disposed to force the weighted leg 45 of the torsion spring 41 to move downwardly when the rear effort end 519 is turned about the pivot axle 23. Specifically, the handle 51 has an upper wall 511 formed with an elongated slot 510 that extends in the front-and-rear direction (X), and two side walls 512 extending downwardly from two opposite sides of the upper wall 511. Each side wall 512 has a pivot hole 515 formed at a front end thereof to serve as the front pivot end 518 to be sleeved around the pivot axle 22, and a holding protrusion 516 disposed rearwardly of the pivot hole 515 and protruding laterally. An upper connecting member 513 is disposed on the upper wall 511 and extends toward the elongated slot 510. The forcing portion 514 is in the form of a rod which extends in the left-and-right direction (Y) and across the side walls 512 to abut against the weighted leg 45 of the torsion spring 41.

The anchoring member 52 is slidably mounted to the front pivot end 518 of the handle 51, and partially projects upwardly of the elongated slot 510. The anchoring member 52 is movably pivoted to the pivot axle 22, and is removably engaged with the upper driven end 314 of the striking member 3. The anchoring member 52 has a top wall 521, two lateral walls 522, and a sliding guide 523. The top wall 521 has an opened slot 520 and a forward anchoring end 524 which is formed forwardly of the opened slot 520 to be engaged in the engaged slot 311 of the striking member 3. The lateral walls 522 extend downwardly from the top wall 521 and are disposed inboard of the side walls 512 of the handle 51. Each lateral wall 522 is engaged with the respective holding protrusion 516, and has a front notched portion 525 to be pivotably connected to the pivot axle 22. The sliding guide 523 is disposed at a rear end of the top wall 521 and projects upwardly from and is slidable along the elongated slot 510.

The biasing member 53 is disposed between the handle 51 and the anchoring member 52 and above the elongated slot 510, and has front and rear ends 531, 532 which are respectively engaged with the sliding guide 523 and the upper connecting member 513 to bias the anchoring member 52 forwardly relative to the handle 51.

Figure 13:
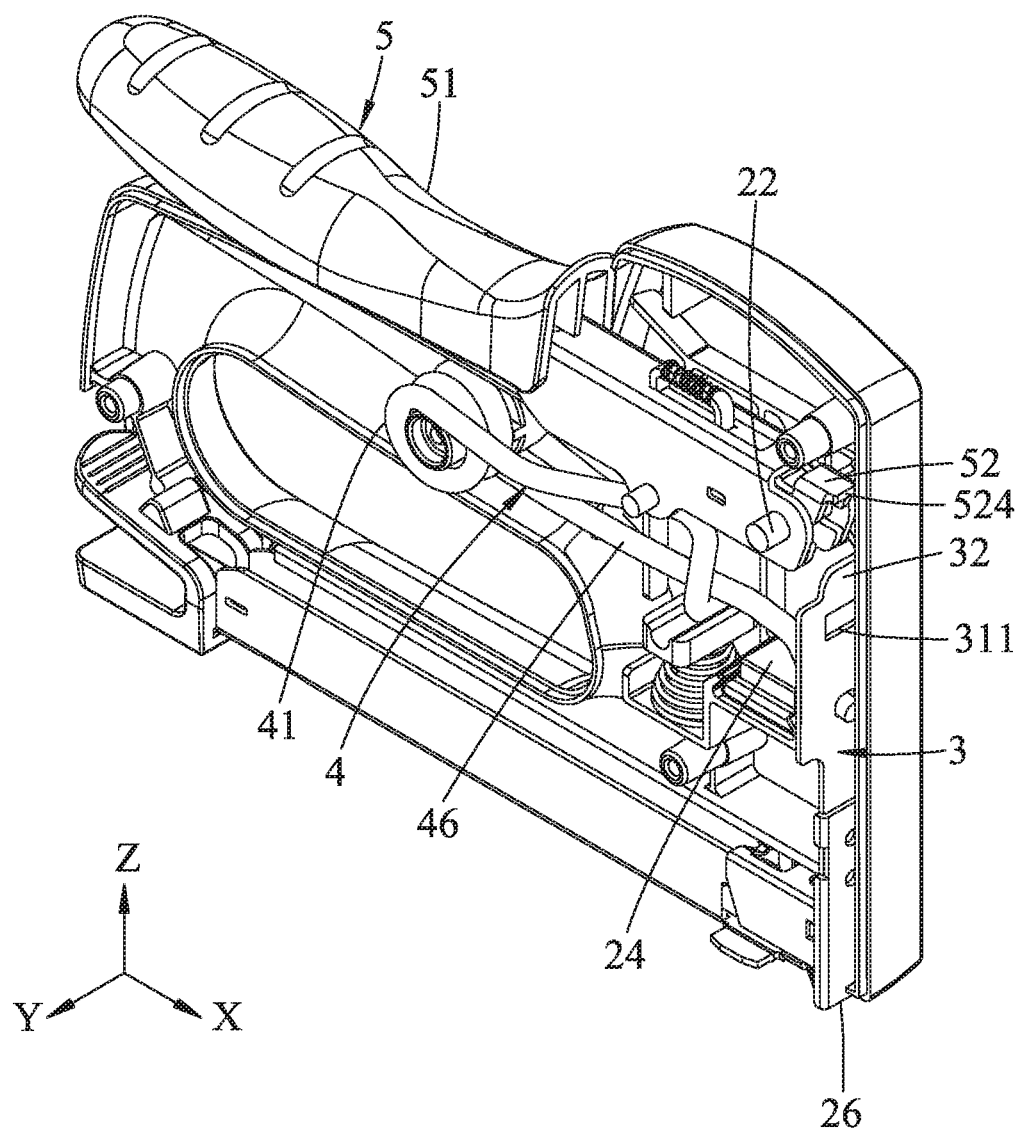

The handle 51 is pivotally movable relative to the pivot axle 22 between a ready position (see FIG. 4) and a striking position (see FIG. 13).

As shown in FIG. 4, when the handle 51 is in the ready position, the forward anchoring end 524 of the anchoring member 52 is engaged in the engaged slot 311 of the striking member 3, and the driving leg 46 is biased against the weighted leg 45. Also, the lower striking end 313 (see FIG. 3) may be slightly higher than a staple (not shown) to be driven.

Figure 11:
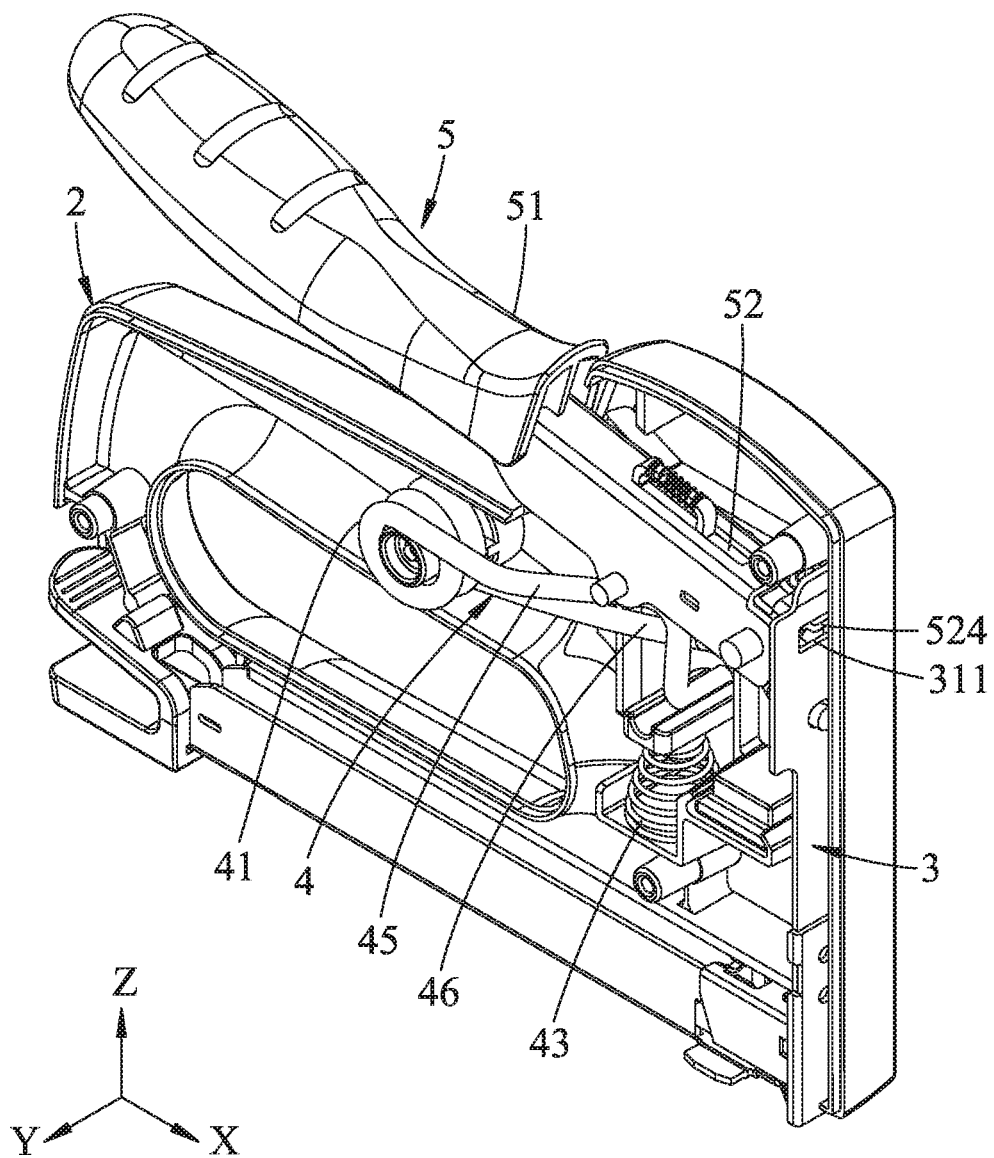
FIGS. 11 to 14 are perspective views similar to FIG. 4, wherein the fastener driving tool during various phases of a fastener driving cycle is illustrated.

Referring to FIG. 11, during the pivotal movement of the handle 51 from the ready position toward the striking position (i.e., through an intermediate position), via an abutting engagement of the forcing portion 514 of the handle 51 with the weighted leg 45 of the torsion spring 41, the weighted leg 45 is moved downwardly to compress the return spring 43 to generate the return energy, while the anchoring member 52 is moved with the handle 51 for being brought upwardly and rearwardly to engagingly move the striking member 3 and the driving leg 46 of the torsion spring 41 upwardly to gradually increase a loading of the torsion spring 41 for downward striking the striking member 3.

Figure 12:
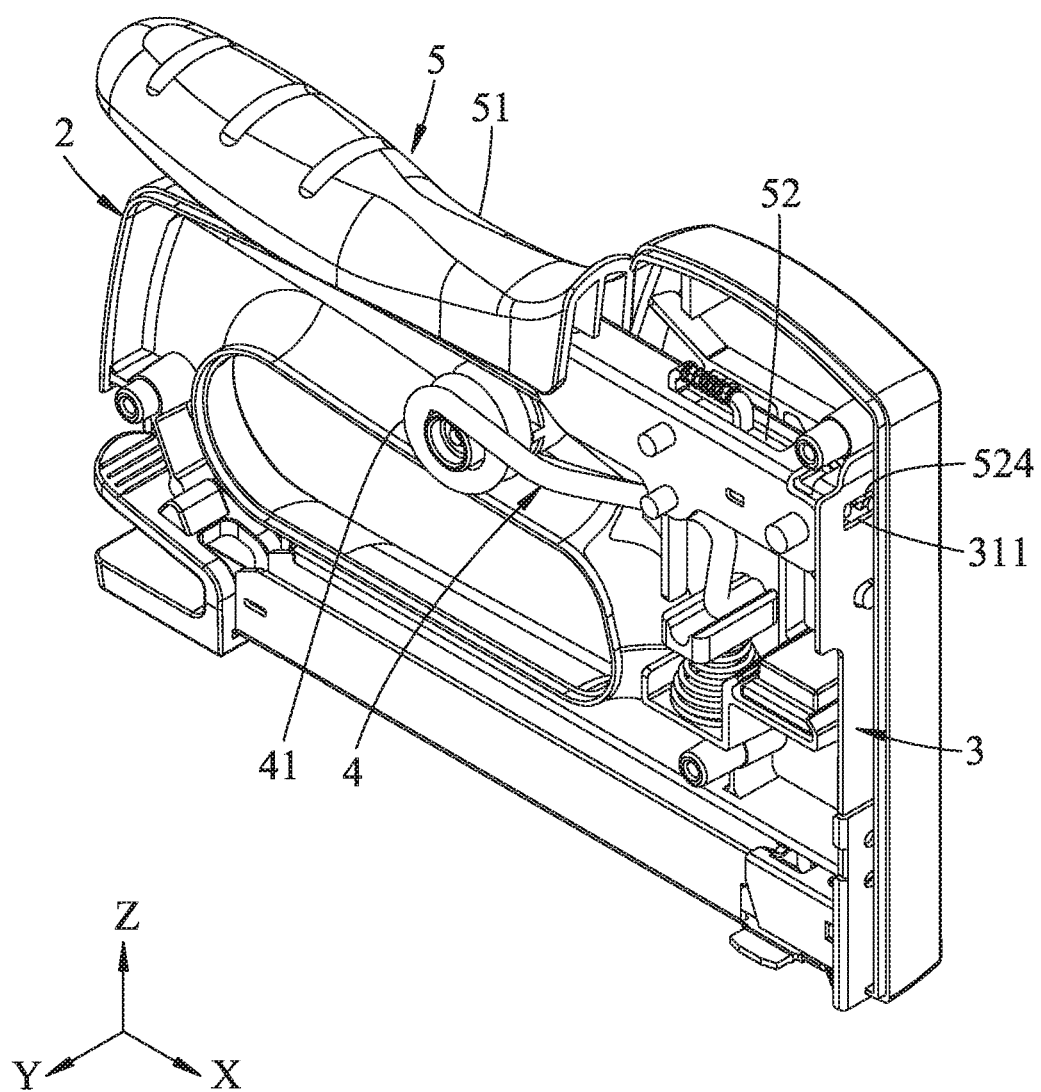

As shown in FIG. 12, once the handle 51 approaches closely to the striking position, the forward anchoring portion 524 of the anchoring member 52 is able to be disengaged from the engaged slot 311 of the striking member 3. Next, in the striking position as shown in FIG. 13, the forward anchoring portion 524 is disengaged from the engaged slot 311 while the torsion spring 41 is freed to release a biasing energy to move the striking member 3 downward toward the fastener striking opening 26 by the driving leg 46 for performing a fastener striking stroke. At this stage, the downward movement of the driving leg 46 is stopped by the stop 24.

Figure 14:
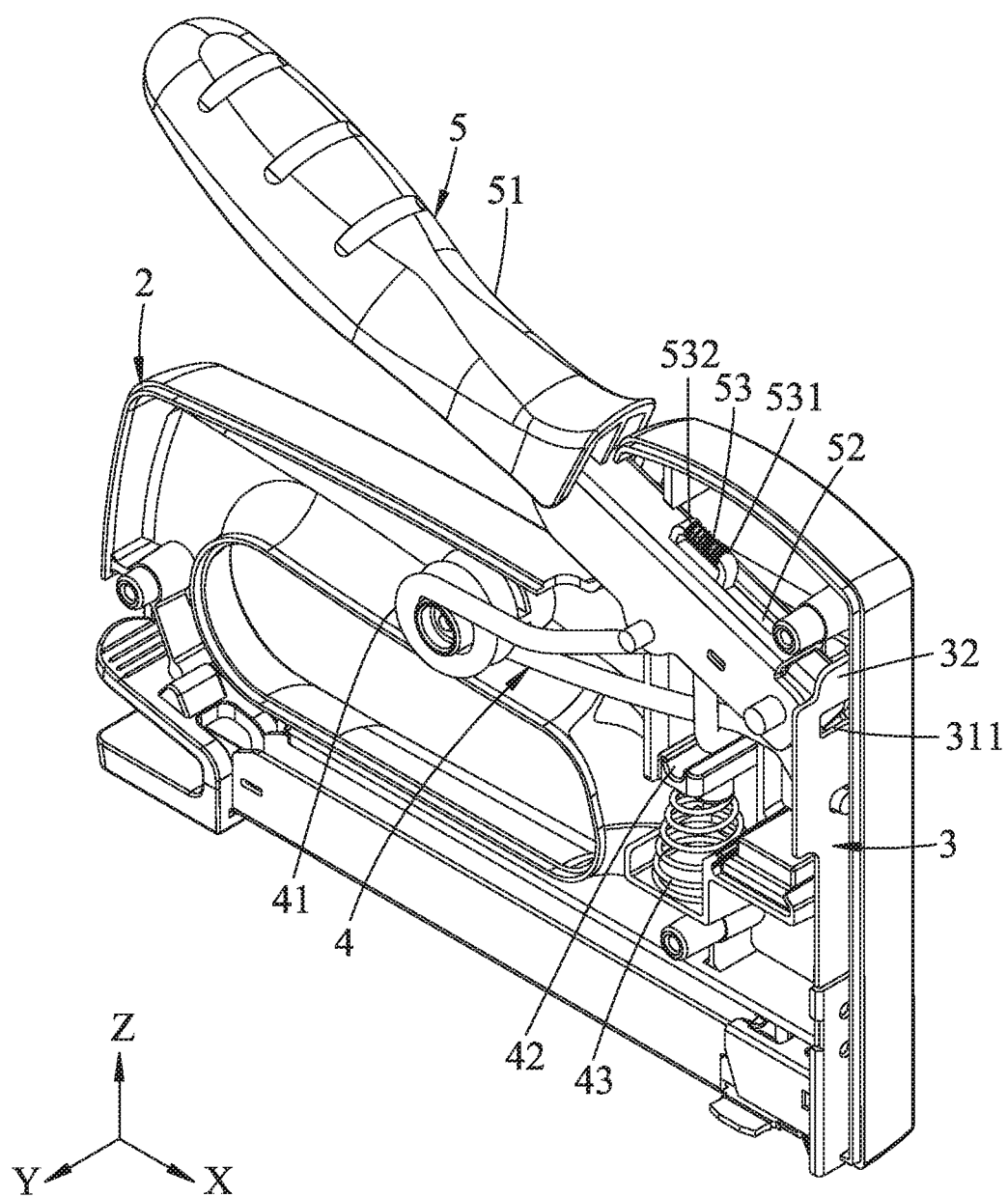

Then, referring to FIG. 14, the handle 51 is released from the user, and is returned to the ready position by means of the return spring 43. During a pivotal movement of the handle 51 from the striking position to the ready position, the return spring 43 is freed to release the return energy to urge the holding seat 42 and the torsion spring 41 upwardly and to pivot the handle 51 and the anchoring member 52 about the pivot axle 22. Meanwhile, the driving leg 46 of the torsion spring 41 and the striking member 3 are moved upwardly to make a sliding engagement of the sliding portion 32 of the striking member 3 with the forward anchoring end 524 of the anchoring member 52 in the up-and-down direction (Z), while the biasing member 53 is loaded (with a rearward movement of the anchoring member 52) to accumulate a biasing force that urges the anchoring member 52 to be engaged in the engaged slot 311.

Finally, with the downward pivotal movement of the forward anchoring end 524 of the anchoring member 52 and the upward movement of the striking member 3, the forward anchoring end 524 is registered with and engaged in the engaged slot 311 of the striking member 3 by means of the biasing member 53.

Example 1

The aforesaid embodiment is implemented as Example 1, which is used with a variety of staples (not shown) for striking the staples on an object made of white pine. Regarding Example 1, the wire diameter of the torsion spring 41 is 3.5 mm, the included angle (θ2) is 28 degrees, and the preloaded potential energy measured by a spring pressure testing method is 16.3 kg. The results of the status of the staples on the white pine object are shown in Table 1 and are categorized as follows: "A" which indicates that a whole staple is driven in the object; "B" which indicates that the crown of the staple is flush with or slightly lower than the upper surface of the object; and "C" which indicates that the crown of the staple is slightly higher than the upper surface of the object.

TABLE 1

| Staple Model No. | Staple length (mm) | Wire diameter (mm) | Angle (θ2) | Result |
|---|---|---|---|---|
| 13 | 12 | 3.5 | 28 | C |
| 13 | 14 | 3.5 | 28 | C |
| T50 | 8 | 3.5 | 28 | B |
| T50 | 10 | 3.5 | 28 | C |
| T50 | 12 | 3.5 | 28 | C |
| T50 | 14 | 3.5 | 28 | C |

Example 2

The aforesaid embodiment is implemented as Example 2, which is used with a variety of staples (not shown) for striking the staples on an object made of white pine. Regarding Example 2, the wire diameter of the torsion spring 41 is 4.0 mm, the included angle (θ2) is 28 degrees, and the preloaded potential energy measured by a spring pressure testing method is 27.4 kg. The results of the status of the staples on the white pine object are illustrated in Table 2.

TABLE 2

| Staple Model No. | Staple length (mm) | Wire diameter (mm) | Angle (θ2) | Result |
|---|---|---|---|---|
| 13 | 12 | 4.0 | 28 | A |
| 13 | 14 | 4.0 | 28 | A |
| T50 | 8 | 4.0 | 28 | A |
| T50 | 10 | 4.0 | 28 | A |
| T50 | 12 | 4.0 | 28 | A |
| T50 | 14 | 4.0 | 28 | B |

Example 3

The aforesaid embodiment is implemented as Example 3, which is used with a variety of staples (not shown) for striking the staples on an object made of white pine. Regarding Example 3, the wire diameter of the torsion spring 41 is 3.5 mm, the included angle (θ2) is 43 degrees, and the preloaded potential energy measured by a spring pressure testing method is 19.4 kg. The results of the status of the staples on the white pine object are illustrated in Table 3.

TABLE 3

| Staple Model No. | Staple length (mm) | Wire diameter (mm) | Angle (θ2) | Result |
|---|---|---|---|---|
| 13 | 12 | 3.5 | 43 | B |
| 13 | 14 | 3.5 | 43 | C |
| T50 | 8 | 3.5 | 43 | B |
| T50 | 10 | 3.5 | 43 | B |
| T50 | 12 | 3.5 | 43 | C |
| T50 | 14 | 3.5 | 43 | C |

Specifically, with a larger wire diameter of the torsion spring 41 comes more preloaded potential energy, such that the striking energy of the fastener driving tool accumulated by the torsion spring 41 can be increased. Also, with a larger included angle (θ2) comes more preloaded potential energy, such that the striking energy of the fastener driving tool accumulated by the torsion spring 41 can be increased. Thus, the preloaded potential energy of the torsion spring 41 can be varied by changing the wire diameter and the included angle (θ2) to be used with a variety of staples.

As illustrated, with the torsion spring 41 having the driving leg 46 biased against the weighted leg 45 in the loaded state when mounted in the housing 2 of the fastener driving tool to be preloaded with a downward potential energy, the striking member 3 and the torsion spring 41 can be moved upwardly in a less distance by the operation of the handle 51 during the fastener driving cycle, which renders the operation of the handle 51 effortless. With the torsion spring 41 having a wire diameter ranging from 3 mm to 4.5 mm, or the included angle (θ2) between the connecting segment 451 of the weighted leg 45 and the extending segment 461 of the driving leg 46 ranging from 15 degrees to 45 degrees, the torsion spring 41 can be preloaded with a sufficient preloaded potential energy, and the driving leg 46 can be readily biased from the unloaded state to the loaded state.

Figure 15:
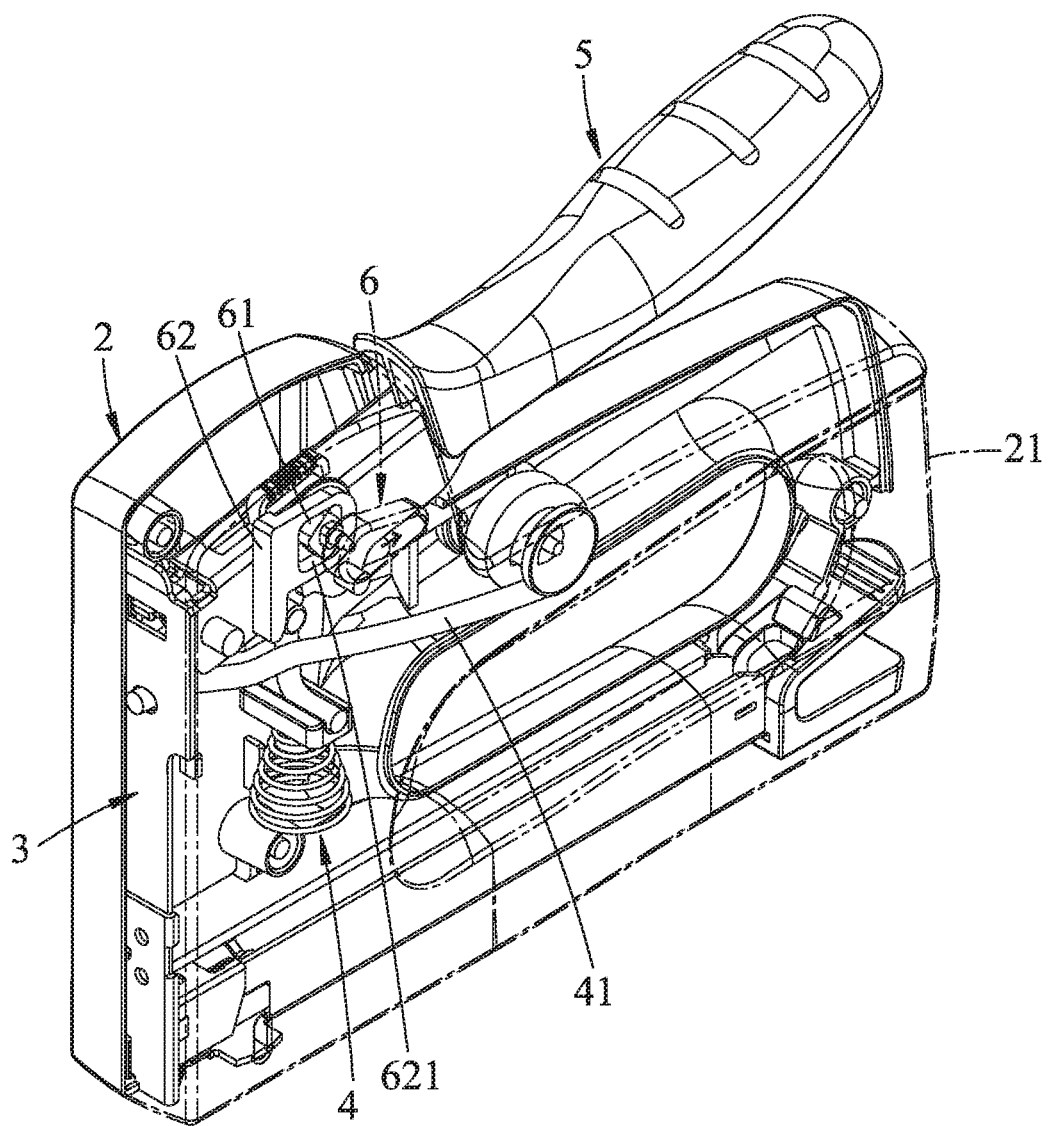
FIG. 15 is a perspective view of another embodiment of a fastener driving tool according to the disclosure, wherein a housing half of the embodiment is removed for the sake of clarity.
Figure 16:
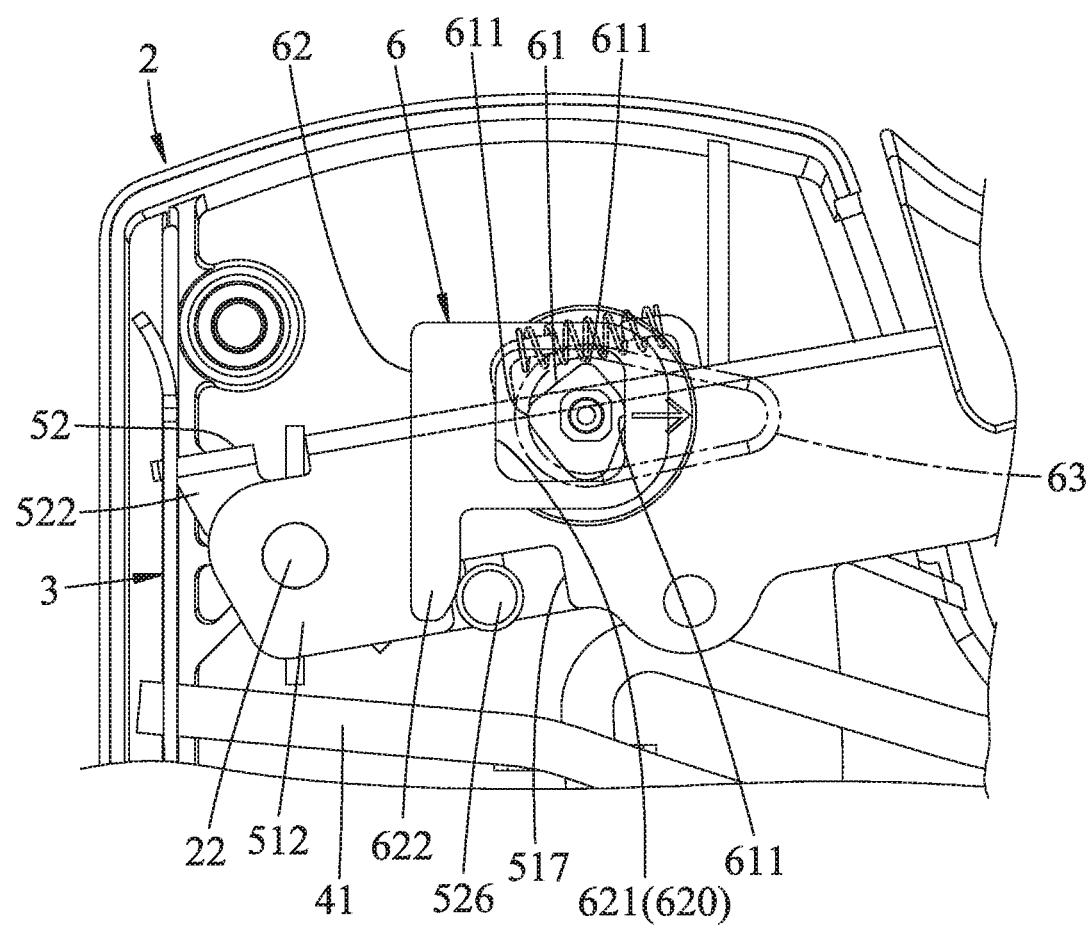
FIG. 16 is a fragmentary side view illustrating an adjusting unit of the embodiment in FIG. 15.
Figure 17:
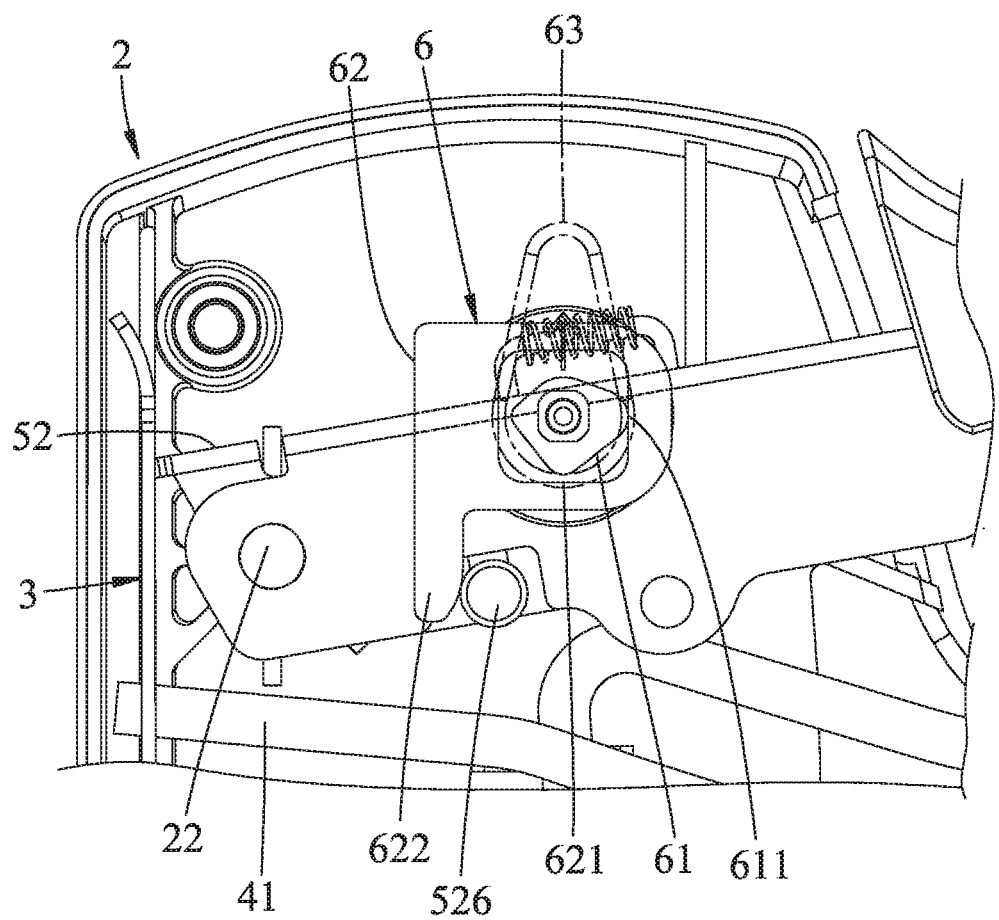
FIG. 17 is a view similar to FIG. 16, illustrating a state where a rotary knob is rotated relative to a housing of the embodiment in FIG. 15.

Referring to FIGS. 15 to 17, in another embodiment, the fastener driving tool further includes an adjusting unit 6. One of the side walls 512 of the handle 51 has a lower notched portion 517. One of the lateral walls 522 of the anchoring member 52 has a pressed portion 526 received within and movable relative to the lower notched portion 517.

The adjusting unit 6 is in the form of a cam mechanism, and includes a sliding member 62 which is slidably mounted relative to the housing 2 in the front-and-rear direction (X) and which has an inner surrounding wall surface 621 that defines a rectangular opened slot 620 to serve as a cam follower, and a pressing portion 622 that is formed on a lower end of the sliding member 62 to abut against the pressed portion 526 of the anchoring member 52, a cam 61 which is rotatably mounted on one of the housing halves 21 and into the opened slot 620 and which has four cam surface regions 611 angularly displaced from one another about the rotating center of the cam 61 and facing the inner surrounding wall surface 621, and a rotary knob 63 which is connected to the cam 61 and projects outwardly of the housing 2. The cam 61 is rotated by operating the rotary knob 63 to move the anchoring member 52 in the front-and-rear direction relative to the pivot axle 22, through the pushing engagement of one of the cam surface regions 611 with the wall surface 621, so as to vary the time when the forward anchoring end 524 is disengaged from the striking member 3 during the fastener striking stroke, thereby adjusting the striking energy of the torsion spring 41. For example, as shown in FIG. 16, when the cam 61 is rotated to have a closest cam surface region 611 to the rotating center pressing on the wall surface 621, the anchoring member 52 is moved forwardly toward the pivot axle 22 so as to delay the disengagement of the anchoring member 52 from the striking member 3, and hence the striking energy of the torsion spring 41 can be rendered greater. As shown in FIG. 17, when the cam 61 is rotated to have a farthest cam surface region 611 from the rotating center pressing on the wall surface 621, the anchoring member 52 is moved rearwardly relative to the pivot axle 22 so as to expedite the disengagement of the anchoring member 52 from the striking member 3, and hence the striking energy of the torsion spring 41 can be rendered smaller.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A torsion spring mountable on a fastener driving tool to be biased for storing a striking energy in an up-and-down direction, comprising:
   a coil wound about a coil axis that extends in a left-and-right direction when said torsion spring is mounted on the fastener driving tool, and having first and second coil ends opposite to each other in both the left-and-right direction and the up-and-down direction;
   a weighted leg having a connecting segment extending forwardly from said first coil end of said coil, a middle segment extending downwardly from an end of said connecting segment opposite to said first coil end, and a first distal end being a free end and extending from an end of said middle segment in the left-and-right direction toward said second coil end; and
   a driving leg having an extending segment which extends forwardly from said second coil end of said coil to terminate at a second distal end, said extending segment being configured to be disposed downwardly of and spaced apart from said first distal end in an unloaded state before said torsion spring is mounted on the fastener driving tool, and to be biased against and engaged with said first distal end in a loaded state when said torsion spring is mounted on the fastener driving tool, so as to be preloaded with a downward potential energy that urges a downward movement of said second distal end, said driving leg defining a reference line that extends in a front-and-rear direction and through a center of a wire diameter of said second distal end, said torsion spring being configured such that said coil is offset from the reference line in the unloaded state, and is located at the reference line in the loaded state, where said extending segment is biased against and engaged with said first distal end.

2. The torsion spring as claimed in claim 1, wherein said first distal end extends to intersect said middle segment by an included angle not more than 90 degrees.

3. The torsion spring as claimed in claim 1, wherein said torsion spring is made of a metal wire which is twisted and which has a wire diameter ranging from 3 mm to 4.5 mm.

4. The torsion spring as claimed in claim 1, wherein said connecting segment of said weighted leg extends tangentially from said first coil end of said coil and along a first extending line, said extending segment of said driving leg extending tangentially from said second coil end of said coil and along a second extending line, the second extending line intersecting the first extending line by an included angle ranging from 15 degrees to 45 degrees.

5. A fastener driving tool comprising:
   a housing defining a housing space therein, and having a pivot axle which is disposed in said housing space, a coil axle which is disposed rearwardly of said pivot axle, and a fastener striking opening at a bottom of a forward end of said housing;
   a striking member mounted in said housing space for reciprocal movement in an up-and-down direction, said striking member having a lower striking end which faces said fastener striking opening, and an upper driven end which is opposite to said lower striking end;
   an energy storing unit disposed in said housing space, and including a torsion spring which is twistable about said coil axle, said torsion spring having a coil which is rotatably sleeved around said coil axle, and which has first and second coil ends opposite to each other in both a left-and-right direction and the up-and-down direction, a weighted leg which has a connecting segment extending forwardly from said first coil end of said coil, a middle segment extending downwardly from an end of said connecting segment opposite to said first coil end, and a first distal end being a free end and extending from an end of said middle segment in the left-and-right direction toward said second coil end, and a driving leg which has an extending segment extending forwardly from said second coil end of said coil to terminate at a second distal end, said extending segment being configured to be disposed downwardly of and spaced apart from said first distal end in an unloaded state before said torsion spring is disposed in said housing space, and to be biased against and engaged with said first distal end in a loaded state when said torsion spring is disposed in said housing space, said driving leg defining a reference line that extends in the front-and-rear direction and through a center of a wire diameter of said second distal end, said torsion spring being configured such that said coil is offset from the reference line in the unloaded state, and is located at the reference line in the loaded state, where said extending segment is biased against and engaged with said first distal end, said second distal end being disposed forwardly of said first distal end to engage with said striking member, said driving leg being biased against and engaged with said first distal end so as to be preloaded with a downward potential energy that urges a downward movement of said second distal end and said striking member, said energy storing unit further including a return spring which is disposed downwardly of said weighted leg to be compressed by said weighted leg to store a return energy; and a handle unit including a handle having a front pivot end which is pivotably mounted in said housing space and on said pivot axle, a rear effort end which is opposite to said front pivot end, and a forcing portion which is interposed between said front pivot end and said rear effort end and which is disposed to force said weighted leg to move downwardly when said rear effort end is turned about said pivot axle, said handle unit further including an anchoring member which is movably mounted to said front pivot end of said handle and which is removably engaged with said upper driven end of said striking member, and a biasing member which is disposed to bias said anchoring member forwardly such that said handle is pivotally movable relative to said pivot axle from a ready position, where said anchoring member is engaged with said striking member, through an intermediate position, where, via an abutting engagement of said forcing portion with said weighted leg, said weighted leg is moved downwardly to compress said return spring to generate the return energy, and where said anchoring member is moved with said handle for being brought upwardly and rearwardly to engagingly move said striking member and said driving leg of said torsion spring upwardly to gradually increase a loading of said torsion spring for said striking member, to a striking position, where said anchoring member is disengaged from said striking member, and said torsion spring is freed to release a biasing energy to move said striking member downward toward said fastener striking opening, and such that, during a pivotal movement of said handle from the striking position to the ready position, said return spring is freed to release the return energy to urge said torsion spring upwardly and to cause the pivot movement of said handle and said anchoring member about said pivot axle and an upward movement of said driving leg and said striking member to make a sliding engagement of said striking member with said anchoring member in the up-and-down direction, while said biasing member is loaded to accumulate a biasing force that urges said anchoring member to be engaged with said striking member.

6. The fastener driving tool as claimed in claim 5, wherein said first distal end of said weighted leg extends to intersect said middle segment by an included angle less than 90 degrees.

7. The torsion spring as claimed in claim 1, wherein the middle segment extends vertically from the end of said connecting segment opposite to said first coil end.

8. The fastener driving tool as claimed in claim 5, wherein the middle segment extends vertically from the end of said connecting segment opposite to said first coil end.

* * * * *